United States Patent [19]

Glassmeyer

[11] 3,815,500

[45] June 11, 1974

[54] FREIGHT BRACING APPARATUS FOR A FREIGHT CONTAINER AND METHOD FOR ASSEMBLING SAME

[75] Inventor: John J. Glassmeyer, Covington, Ky.

[73] Assignee: Pullman Incorporated, Chicago, Ill.

[22] Filed: May 7, 1973

[21] Appl. No.: 358,253

[52] U.S. Cl............ 105/369 A, 105/409, 296/28 M
[51] Int. Cl............................................. B61d 45/00
[58] Field of Search........ 105/369 R, 369 B, 369 D, 105/409, 369 A; 296/28 M

[56] References Cited
UNITED STATES PATENTS

| | | | |
|---|---|---|---|
| 2,570,368 | 10/1951 | Moon | 105/369 A |
| 2,839,013 | 6/1958 | Gunnell et al. | 105/369 A |
| 2,914,004 | 11/1959 | Hopkins | 296/28 M X |
| 2,919,663 | 1/1960 | Neuhart | 296/28 M X |
| 3,071,086 | 1/1963 | Dunlap | 105/369 B |
| 3,376,063 | 4/1968 | Hulverson | 296/28 M |
| 3,547,483 | 12/1970 | Ehrlich | 105/409 X |

*Primary Examiner*—M. Henson Wood, Jr.
*Assistant Examiner*—Gene A. Church
*Attorney, Agent, or Firm*—Richard J. Myers

[57] ABSTRACT

In a freight container for a vehicle or the like a side wall construction for lading control including a side wall of plywood core overlaid with fiberglass reinforced polyester skin, a plurality of upright lading bracing attachment structures each including an upright panel punched with a pattern of logistic slots being slid lengthwise into an upright retainer, said logistic slots being spaced from one another vertically and access holes being punched in the panel between the logistic slots, each hole permitting lock bolts extending from the outside through the holes to have nuts or other fastening means put on the lock bolts, thereby clamping the retainer and the panel tightly to the side wall. The panel may be made slightly less in length than the retainer, then the lock bolt hole may be drilled through the side wall and the retainer in line with respective logistic slots, then the lock nuts may be placed on the bolts through the logistic slots and then the panel may be shifted to hide the nuts therebehind and to allow for coupling of lading strap to the logistic slot without interference from the nut and bolt arrangement.

6 Claims, 6 Drawing Figures

PATENTED JUN 11 1974
3,815,500
SHEET 1 OF 2
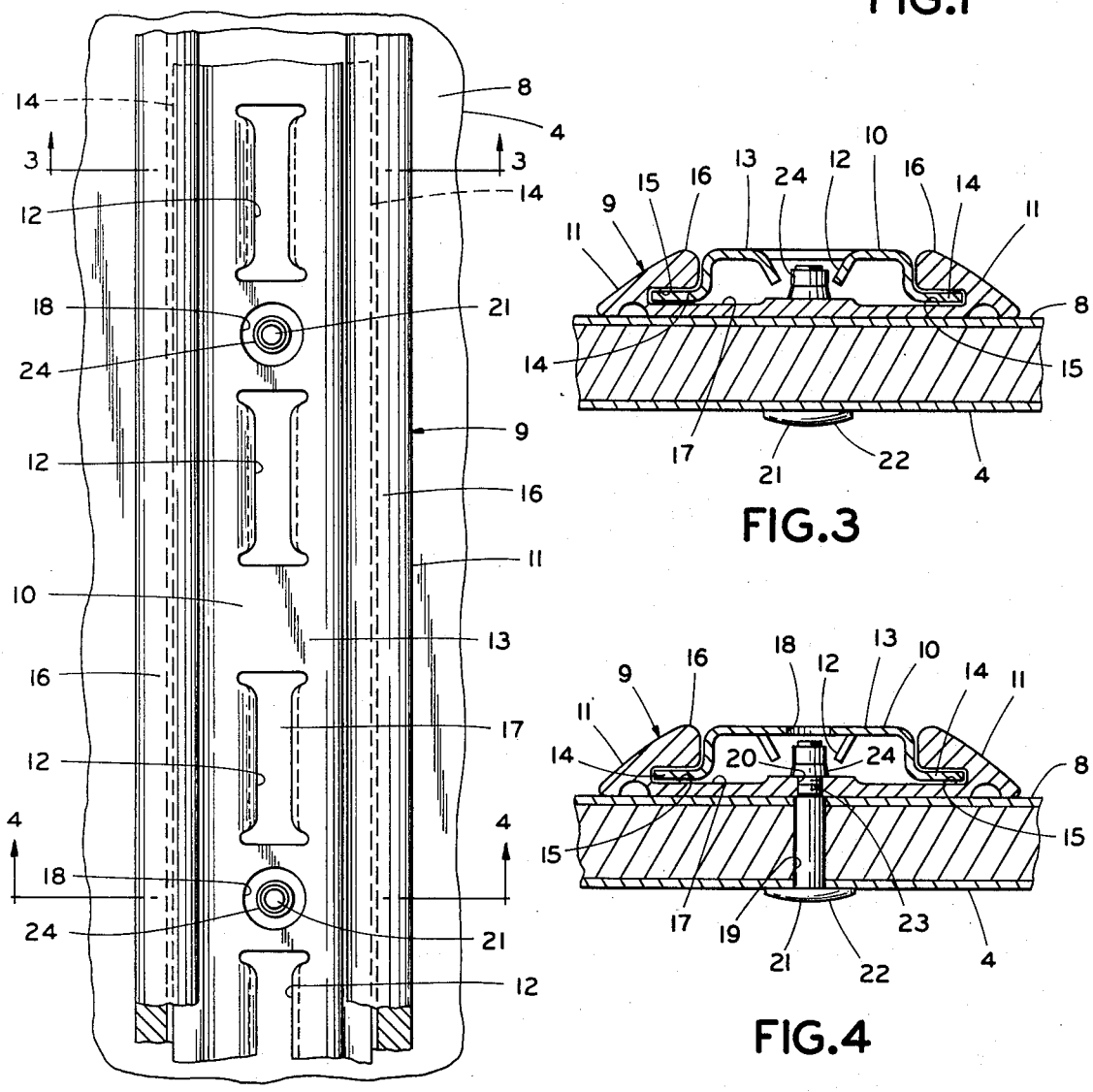

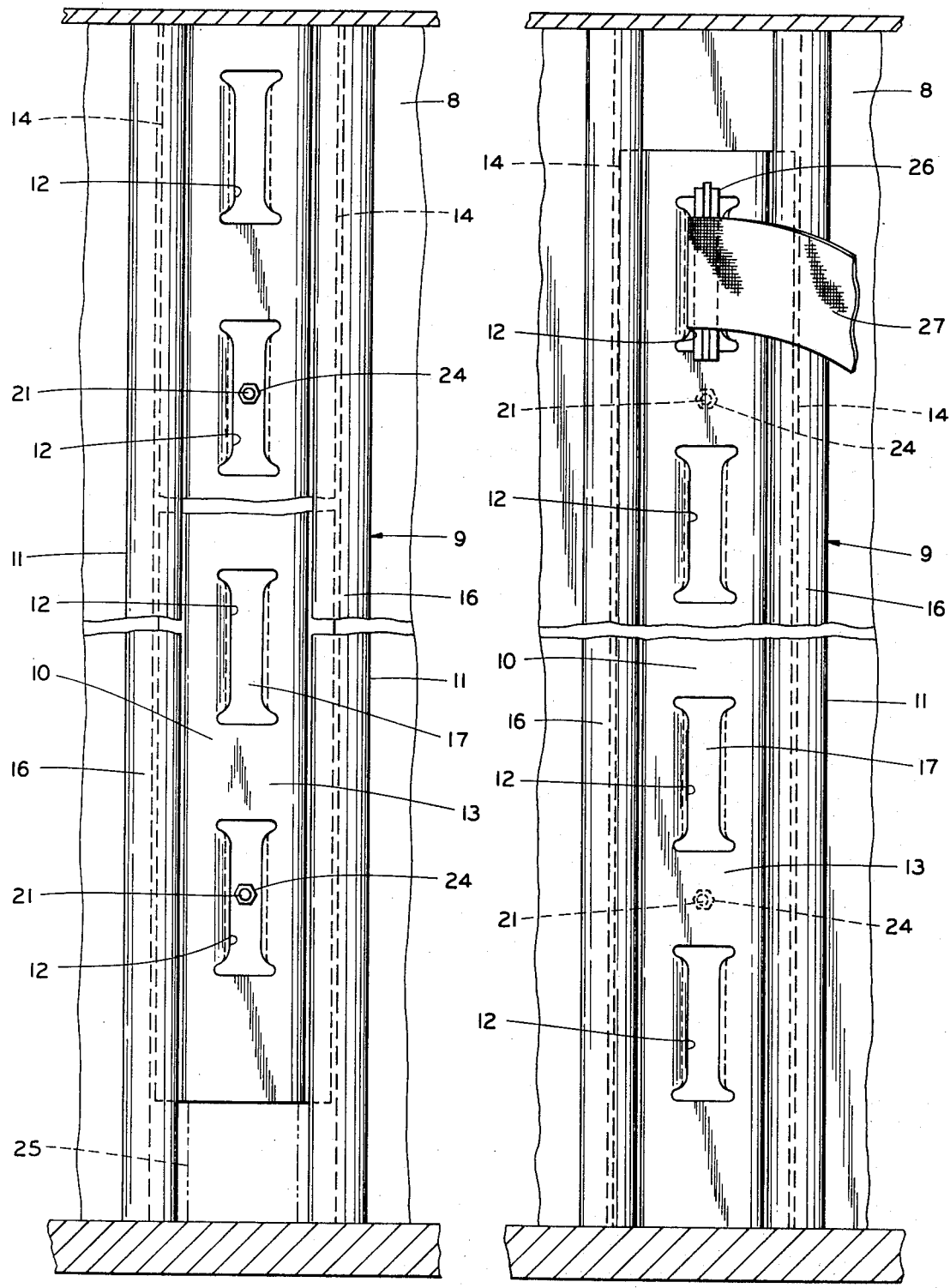

FREIGHT BRACING APPARATUS FOR A FREIGHT CONTAINER AND METHOD FOR ASSEMBLING SAME

BACKGROUND OF THE INVENTION

1. Field of the Invention

This invention relates to the field of lading strap or bars for bracing, securing or supporting freight or lading within a freight container or cargo body of a vehicle such as a highway trailer or freight car and more particularly this invention relates to the use of load bracing apparatus employing a plurality of logistic slots which couple with the end of lading strap or other structure for cargo restraint and for supplying decking for the cargo at various levels.

2. Description of the Prior Art

FRP/plywood trailers, that is, trailers having side walls, front wall and, sometimes, roof made of single piece panels of plywood cores overlaid with fiberglass reinforced polyester skins, are enjoying popularity in an area of the trailer market involved in the movement of household appliances. It is quite likely that furniture movers will more and more see advantages through this ype of construction as opposed to the currently predominant metal post and sheet construction for furniture vans. Furniture movers will require logistic slot panels for cargo restraint and decking. U.S. Pats. Nos. 3,071,086, 2,892,421 and 3,422,508 are examples of the use of lading bracing structure using a plurality of space apertures or logistic slots on the interior side walls of the vehicle or like. These logistic slot panels must be installed in such a manner as not to cause damage to furniture by sharp edges. This invention has for its purpose to provide structure and technique to use logistic slot panels in plywood trailers.

SUMMARY OF THE INVENTION

This invention has for its general object the provision of a plurality of logistic slot structures mountable on the interior side walls of a freight container in an upright manner to receive cargo restraint and decking structure. By such an arrangement the logistic slots receive the hooks of lading strap to tie lading to the side walls of the container or the lading straps may otherwise restrict movement of the freight within the container particularly if it is on a vehicle. The logistic slots may also receive bars which straddle the width of the vehicle for supporting lading thereon in decking fashion.

It is a further object of this invention to provide for a plurality of lading strap bar attachment structures each including an upright logistic slot panel receivable in a longitudinally extending retainer structure, such as an aluminum extruded member, which extruded member and panel are attached to the inside wall of the cargo body by bolt means. Each panel and retainer member may be assembled together and placed in vertically extending position to form a plurality of horizontally spaced strips on the interior sides of the cargo body. Then access holes are drilled between the logistic slots in the panels and then bolt means are passed from the outside through the inside extruded member and panel and have nut means placed through the access holes on the inside of the cargo body for fastening of each panel and extruded member to the side wall. Further, each panel and extruded member may be offset from one another in an upright position and the bolt holes drilled in line with the logistic slots and the bolts pass through the drilled holes and then the panel may be moved so that the nuts on the bolts are clear of the logistic slots.

These and other objects and advantages will become apparent from reference to the following description, appended claims and attached drawings.

BRIEF DESCRIPTION OF THE DRAWINGS

FIG. 1 is a partial view of a trailer showing use of the inventive logistic slot panel and retainer member on the inside of the trailer;

FIG. 2 is a partial elevational view of the panel and extruded member on the inside wall of the trailer;

FIG. 3 is a sectional view taken along line 3—3 of FIG. 2;

FIG. 4 is a sectional view taken along line 4—4 of FIG. 2;

FIG. 5 is illustrative of assembly of panel and retainer member for drilling bolt holes through the trailer side wall, the retainer member, and in line with a logistic slot in the panel; and FIG. 6 is a view of the assembled extruded retainer member, steel panel, and trailer side wall with the bolt means tying the panel and retainer member to the side wall being hidden by the panel.

DESCRIPTION OF THE PREFERRED EMBODIMENT

With reference now to the drawings and in particular with reference to FIGS. 1-4 there is shown a highway trailer 2 having side walls 3 and 4 and a roof 5 made of FRP/plywood (trailers having side walls and roof made of single piece panels of plywood cores overlaid with fiberglass reinforced polyester skins) rear doors 6 and bogies 7. The interior side 8 of the side wall 4 is exposed to disclose a plurality of upright combination steel panel and aluminum extrusion retainer assemblies 9 each of which comprises the steel panel or logistic slot-bearing member 10 and the retainer member 11 of aluminum extrusion. Each steel panel 10 is an elongated member that extends longitudinally and vertically of the vehicle and is provided with a plurality of vertically spaced logistic slots 12. These logistic slots are located in the interior face portion of vertical plate portion 13 of the steel panel 10 which has recessed curved end portions 14 which extend into and are entrapped by slots 15 formed by the overlapping back portions and the inner flat vertical plate portion 17 of the aluminum extruded retainer member 11. Access holes 18 are provided in the inner flat front face portion 13 of the steel panel 10 between every couple of logistic slots 12 and these access holes are in line with bores 19 and 20 in the side wall 4 and the inner flat vertical plate portion 17 of the retainer member 11 for receiving a Huck bolt 21 which has an outer head 22 on the outside of the panel 4 and has an inner threaded end projecting inwardly of the extruded member 11 but not outwardly of steel panel 10, a collar or nut-like member 24 being pressed over the threaded end 23 as, for instance, shown by U.S. Pat. No. 3,421,562.

In assembling, the steel panel 10 punched with the pattern of log slots 12 is slid lengthwise into the rounded-edge aluminum extrusion member 11, the rounded edges of the aluminum member being designated by numeral 25 and prevent tearing or scuffing of the lading goods should they come in contact with the extruded member. Next, at pre-determined intervals, the round access holes 18 are punched in the steel panel 10, these holes being of sufficient diameter to permit entry of the nose of a pull-up tool as is used with the lock-bolts 21. Next, the panel and extrusion assembly is placed in its proper upright position along the length of the FRP/plywood panel and then the lock-bolt holes 19 and 20 are drilled from inside out, using the pull-up access holes 18 as a guide. Then, the lock-bolts 21 are inserted from the outside, lock-bolt collars 24 are placed on the lock-bolt from the inside and then the pull-up tool is used to assemble the collar 24 and lock-bolt 21, thereby clamping the aluminum extrusion member 11 tightly to the FRP/plywood panel.

In alternate design an installation method of installing the logistic slot panel in aluminum extrusions on the FRP/plywood trailers is shown by FIGS. 5 and 6. FIG. 5 shows the extrusions and panel assembled on end in vertical position with the steel panel shimmed above the aluminum extruded member slightly with the access hole in the plywood panel and in the aluminum extrusion in view just above the bottom of the logistic slot and FIG. 6 shows the section of the trailer inside wall as shown in FIG. 2 but with the access holes in the plywood panel and the aluminum extrusion hidden behind the steel panel. By such an arrangement no round access holes 18 are required. This is accomplished instead by having the steel panel cut shorter in length than the aluminum extrusion by, say, an amount equal to one-half the distance between the logistic slots. The steel panel 10 is then temporarily shimmed up as shown by numeral 25 in FIG. 5 from the bottom end of the aluminum extrusion member 11 during assembly to the panel 4. Holes 19 and 20 for threaded bolts 21 are drilled through the plywood panel 4 and aluminum extrusion member 11 using the logistic slots 12 for access. Bolts 21 are inserted from the outside, nuts or collars 24 are engaged and tightened from the inside and then the temporary shims 25 are removed. This permits the steel panel 10 to slide downward, hiding the nuts or collars 24 from view and preventing their interference with the logistic slot hardware inserts 26 of the lading strap 27. A stake operation is then used to lock the steel panel 10 to the aluminum track 11 to prevent relative longitudinal movement between them.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a freight container for a vehicle or the like a side wall construction for lading control including:
    a side wall of plywood core overlaid with fiberglass reinforced polyester skin,
    a plurality of upright lading bracing structures each including a panel retainer and a panel punched with a pattern of logistic slots being slid lengthwise into said retainer,
    said logistic slots being spaced from one another vertically and access holes being punched in the panel between the logistic slots,
    lock bolt means extending from the outside through the side wall and the retainer and fastening means put on the bolt means via the access holes thereby clamping the retainer and the panel trapped thereby tightly to the side wall.

2. In a freight container for a vehicle or the like a side wall construction for lading control including:
    a side wall of plywood core overlaid with fiberglass reinforced polyester skin,
    a plurality of upright lading bracing structures each including a panel retainer and a panel punched with a pattern of logistic slots being slid lengthwise into said retainer,
    said logistic slots being spaced from one another vertically,
    lock bolt means extending from the outside through the side wall and the retainer and fastening means put on the bolt means thereby clamping the retainer and the panel trapped thereby tightly to the side wall.

3. In a freight container for a vehicle or the like a side wall construction for lading control including:
    a side wall,
    a plurality of horizontally spaced upright lading bracing and supporting structures mounted on the inside of the side wall, each structure including an upright retainer and a panel having a pattern of vertically spaced logistic slots for receiving lading control elements and being slid lengthwise into the retainer,
    said retainer including longitudinally spaced vertically extending clamping end edges wrapping around the edges of the panel allowing exposure of the logistic slots to the interior of the vehicle,
    access holes in the panel being alternately spaced between the slots,
    fastening means extending from the outside through the side wall and the retainer and securing means put by way of the access holes on the fastening means from the inside of the container thereby clamping the retainer and panel trapped thereby tightly to the side wall.

4. In a freight container for a vehicle or the like a side wall construction for lading control including:
    a side wall,
    a plurality of horizontally spaced upright lading bracing and supporting structures mounted on the inside of the side wall, each structure including an upright retainer and a panel having a pattern of vertically spaced logistic slots for receiving lading control elements and being slid lengthwise into the retainer,
    said retainer including longitudinally spaced vertically extending clamping end edges wrapping around the edges of the panel allowing exposure of the logistic slots to the interior of the vehicle,
    fastening means extending from the outside through the side wall and the retainer and securing means put on the fastening means from the inside of the container thereby clamping the retainer and panel trapped thereby tightly to the side wall.

5. The method of assembling a side wall of a container comprising:
    inserting a panel, punched with a pattern of lading bracing and supporting apparatus receiving logistic slots vertically of the panel, lengthwise into a panel retainer having edges entrained around the edges of the panel, assembling the panel and retainer in upright position against the inside of the container wall, punching holes in the panel alternately between the logistic slots, drilling holes from the outside through the panel and retainer in line with access holes, and placing fastening means through the drilled holes from the outside of the container through the inside and placing securing means over the fastening means through the access holes for tightening the panel and retainer against the container wall.

6. Method of constructing a container wall comprising the steps of:

cutting an upright elongated panel of vertically placed logistic slots shorter in length than an associated elongated upright panel receiving retainer by an amount equal to approximately one-half the distance between the logistic slots, sliding the panel into the retainer and then temporarily shimming the bottom end of the panel up from the bottom end of the retainer, drilling fastening means receiving holes through the panel from the inside using the logistic slots for access, inserting fastening means from the outside and having securing means extend through the logistic slots and coupling with the fastening means and then removing the temporary shims, permitting the panel to slide downward hiding the securing means from view and preventing their interference with the logistic slots.

* * * * *